(12) United States Patent
Huang

(10) Patent No.: US 8,994,208 B2
(45) Date of Patent: Mar. 31, 2015

(54) BACKUP POWER FOR OVERVOLTAGE PROTECTION FOR ELECTRIC VEHICLE

(75) Inventor: Fengtai Huang, Northville, MI (US)

(73) Assignee: Magna Electronics Inc., Holly, MI (US)

( * ) Notice: Subject to any disclaimer, the term of this patent is extended or adjusted under 35 U.S.C. 154(b) by 909 days.

(21) Appl. No.: 13/048,858

(22) Filed: Mar. 15, 2011

(65) Prior Publication Data

US 2012/0235613 A1  Sep. 20, 2012

Related U.S. Application Data

(60) Provisional application No. 61/313,890, filed on Mar. 15, 2010.

(51) Int. Cl.
 *H02P 6/14* (2006.01)
 *B60L 3/00* (2006.01)
 *H02M 1/00* (2006.01)

(52) U.S. Cl.
 CPC ...... *B60L 3/0092* (2013.01); *H02M 2001/0006* (2013.01)
 USPC ........................................ 307/9.1; 318/400.26

(58) Field of Classification Search
 USPC ....... 307/9.1; 318/400.26; 323/222; 363/21.1
 See application file for complete search history.

(56) References Cited

U.S. PATENT DOCUMENTS

| | | | |
|---|---|---|---|
| 4,737,898 A * | 4/1988 | Banfalvi | 363/19 |
| 5,479,087 A * | 12/1995 | Wright | 323/267 |
| 5,898,556 A * | 4/1999 | de Sedouy et al. | 361/37 |
| 6,825,641 B2 * | 11/2004 | Pigott | 323/222 |
| 7,969,043 B2 * | 6/2011 | Caraghiorghiopol et al. | 307/82 |
| 2006/0152085 A1* | 7/2006 | Flett et al. | 307/75 |
| 2009/0295224 A1* | 12/2009 | Kobayashi et al. | 307/9.1 |

FOREIGN PATENT DOCUMENTS

JP   2000217248 A  *  8/2000

OTHER PUBLICATIONS

Translation of JP 2000217248 A Translated Nov. 18, 2013.*

* cited by examiner

*Primary Examiner* — Jared Fureman
*Assistant Examiner* — Joel Barnett
(74) *Attorney, Agent, or Firm* — Dickinson Wright PLLC

(57) ABSTRACT

In a first aspect, the invention is directed to a circuit for powering a gate drive for an electric motor for a vehicle with an electric motor. The circuit provides a primary power supply and a secondary power supply that powers the gate drive in the event the primary power supply fails. The primary power supply may draw power from the 12V battery on the vehicle. The secondary power supply may draw power from a high voltage battery pack on the vehicle that is normally used to provide power to the electric motor. By providing the secondary power supply to the gate drive, a 3-phase short can be applied to the motor in the event that it is needed as a safety measure even if there is a failure in the primary power supply.

10 Claims, 3 Drawing Sheets

BACKUP POWER FOR OVERVOLTAGE PROTECTION FOR ELECTRIC VEHICLE

CROSS REFERENCE TO RELATED APPLICATIONS

This application claims priority to U.S. Provisional Patent Application No. 61/313,890 filed Mar. 15, 2010, which is incorporated by reference herein in its entirety.

FIELD OF THE INVENTION

The present invention relates to electric vehicles, which are vehicles having electric motors powered by high voltage battery packs, such as hybrid vehicles and battery-electric vehicles (BEVs).

BACKGROUND OF THE INVENTION

Vehicles that are driven entirely or in part by electric motors are becoming more and more common. These motors typically draw power from a high voltage battery pack in the vehicle, through a high voltage DC bus. Electric vehicles with Permanent Magnet motors can experience over-voltage faults across the high voltage DC bus. For example, when the motor is driven by the inertia of the vehicle, or when the vehicle is travelling down a hill, the permanent magnet motor will function as a generator. Under normal circumstances, the energy generated from the motor in these situations is used to charge the traction battery. However, if the main contactor between the battery and the drive inverter is open as a result of a fault condition, the motor may charge the high voltage DC bus to a voltage level that could damage certain components connected to the bus. Some components, such as the high-voltage DC capacitor, which is provided on some electric vehicles, could catch fire in such a situation.

To prevent this problem, an approach is to short circuit the terminals of the motor together, known as a 3-phase short. This is carried out using the 12V power supply from the 12V battery in the vehicle. In a situation, however, where 12V power was not available, (e.g. if there is a failure in the 12V power supply), then the 3-phase short function will not be available if needed.

It would be advantageous to provide a way of keeping the 3-phase short function available in a situation where there is a failure in the 12V power supply.

SUMMARY OF THE INVENTION

In a first aspect, the invention is directed to a circuit for powering gate drives for an electric motor for an electric vehicle. The circuit provides a primary power supply and a secondary power supply that powers the gate drive in the event the primary power supply fails. The primary power supply may draw power from the 12V battery on the vehicle. The secondary power supply may draw power from a high voltage DC capacitor on the vehicle that is normally used to provide power to the electric motor. By providing the secondary power supply to the gate drives, a 3-phase short function can be provided to the motor in the event that it is needed as a safety measure even if there is a failure in the primary power supply.

BRIEF DESCRIPTION OF THE DRAWINGS

The present invention will now be described by way of example only with reference to the attached drawings, in which.

DETAILED DESCRIPTION OF THE INVENTION

Figure 1:
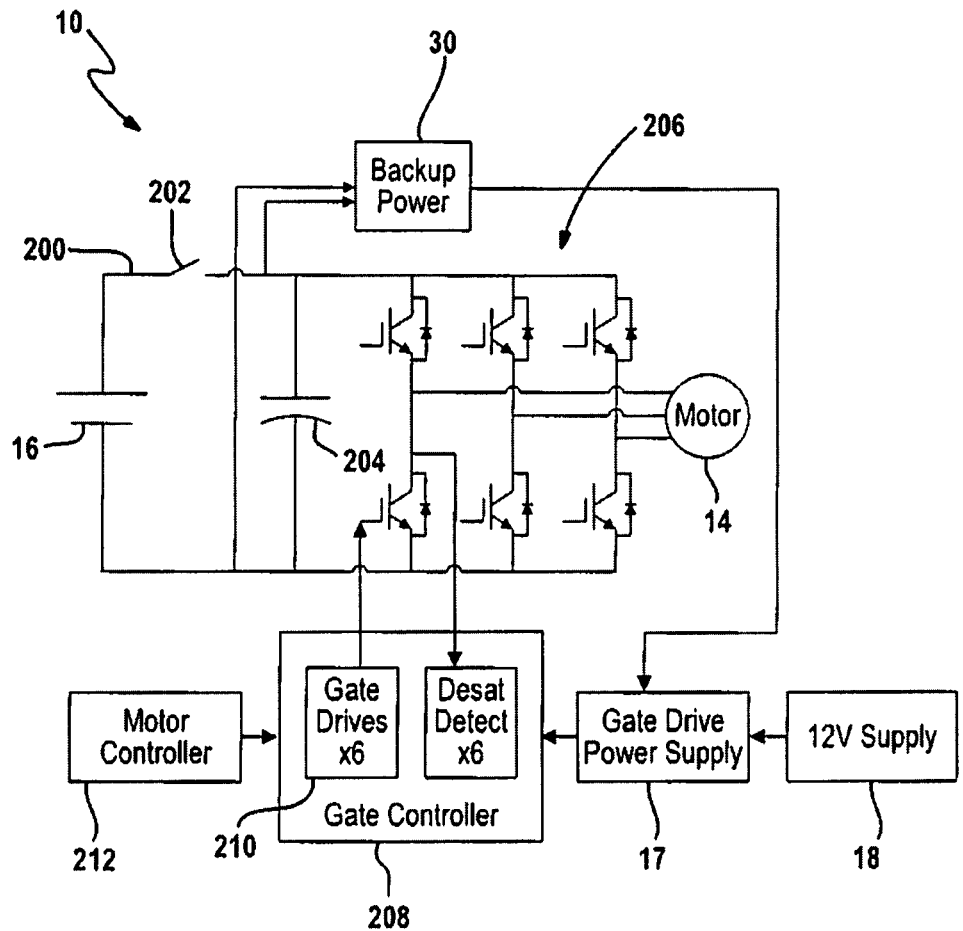
FIG. 1 is a schematic illustration of a gate drive, primary and secondary power supplies and an electric motor in accordance with an embodiment of the present invention.

Reference is made to FIG. 1, which shows a circuit 10 for powering gate drives 210 for an electric motor 14 in a vehicle that is driven at least partially by an electric motor 14 (in particular a permanent magnet motor). The vehicle may be, for example, a battery-electric vehicle that has only an electric motor to drive it, or it may be a hybrid, such as a series hybrid or a parallel hybrid, that has both an electric motor and an internal combustion engine.

The energy source for the electric motor 14 is a high voltage battery pack shown at 16. It will be understood that the battery pack 16 may actually be one of a plurality of battery packs 16 that store energy for powering the electric motor 14. The battery pack 16 may supply power at any suitable voltage, such as about 400V, through a high voltage bus, shown at 200. A main contactor 202 is provided and is controlled by a suitable controller to control the power to permit power from the motor 14 to reach a high voltage DC bus capacitor 204. The capacitor 204 is used to power the IGBTs shown at 206, which drive the motor 14.

A gate controller 208 is provided, which includes 6 gate drives 210, as well as other components. Only one gate drive 210 is shown in FIG. 1, however it will be understood by one skilled in the art that there are 6 gate drives 210. In the event of a situation wherein the main contactor 202 is open and the motor 14 is in a regen mode where it is acting as a generator (e.g. when the vehicle is rolling downhill), the motor 14 will overcharge the capacitor 204 thereby creating a risk of fire, unless some action is taken to prevent this. To prevent this, the gates for all three phases of the motor can be opened at the same time to short circuit the three phases of the motor 14. Under normal operating conditions, the gate drives 210 are powered by a primary power supply 17 which draws power from the 12V battery shown at 18. A motor controller 212 is shown, which controls the operation of the gate controller 208.

Figure 2:
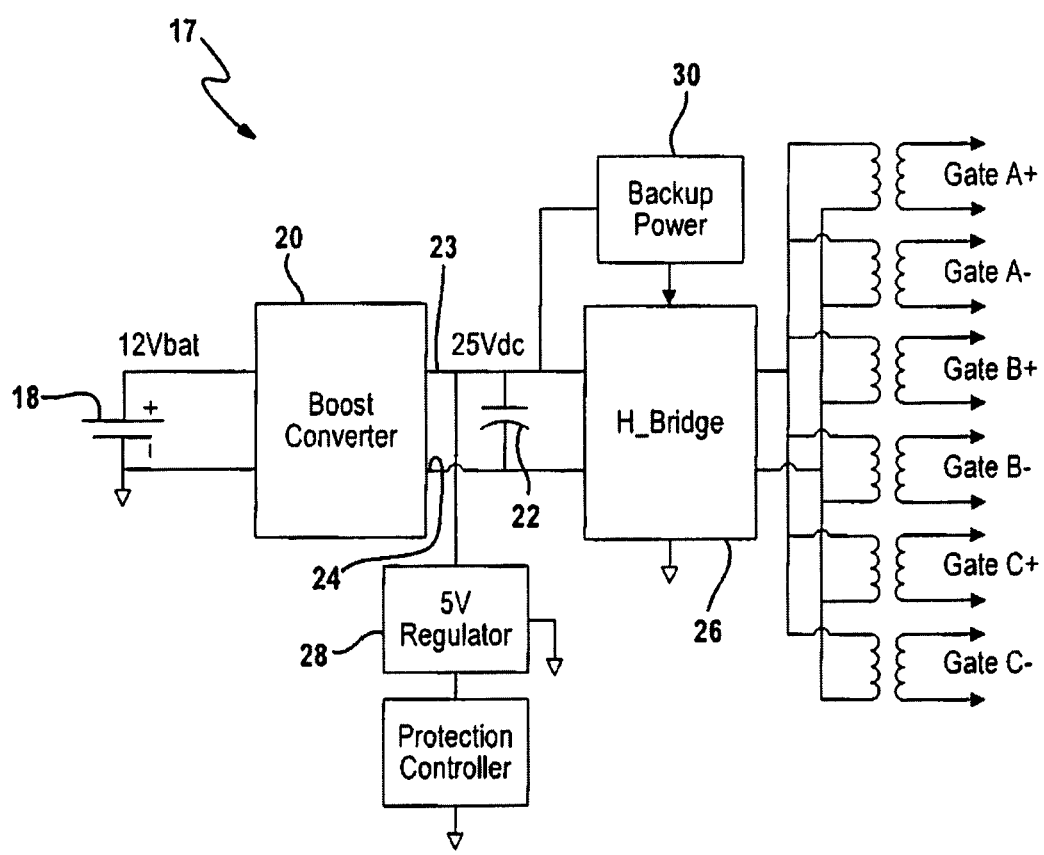
FIG. 2 is a schematic illustration of a primary power supply shown in FIG. 1.

Referring to FIG. 2, the 12V battery 18 is connected to a boost converter 20 (or any other suitable voltage step up device), which boosts the voltage from 12 Vdc to 25 Vdc. A main low voltage capacitor 22 is connected to the positive and negative conduits shown at 23 and 24 between the boost converter 20 and a half-bridge or full bridge 26, which is connected to the gates of the motor 14. A 5V regulator 28 is connected to the positive conduit 23 and provides power to the digital circuit of the gate drive 12.

Figure 3:
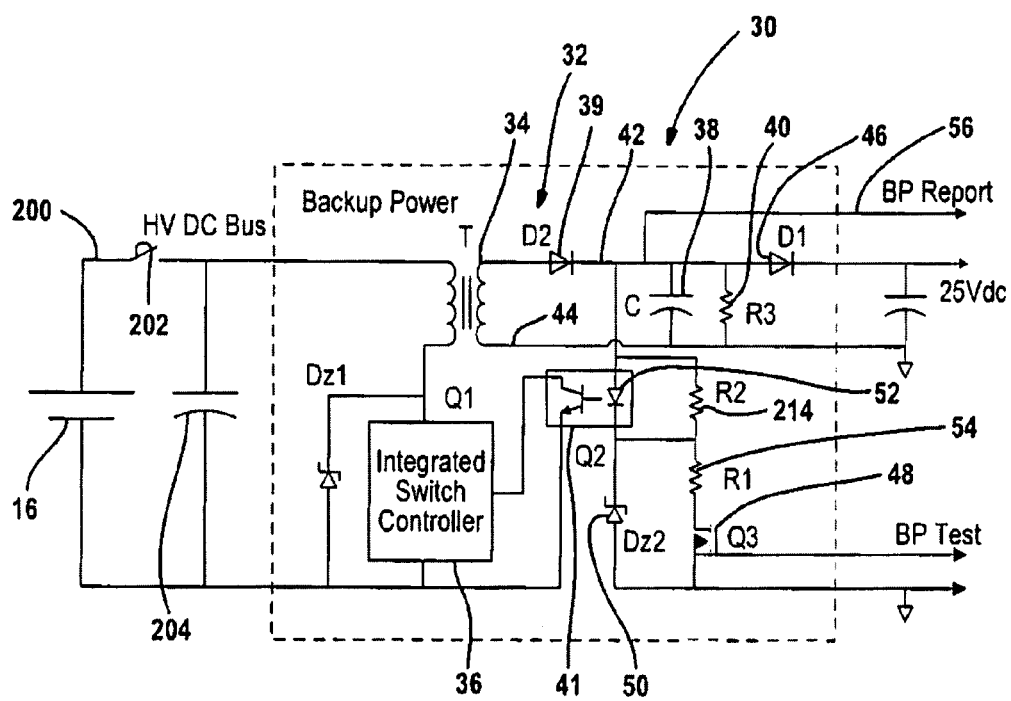
FIG. 3 is a schematic illustration of a secondary power supply shown in FIG. 1.

The circuit 10 further includes a secondary power supply 30 (FIGS. 1 and 3) to provide backup power to the gate drives 210 in the event of failure of the primary power supply 17 to deliver power from the 12V battery 18. The secondary power supply 30 provides this backup power relatively inexpensively, with relatively few components and with relatively little power loss.

The secondary power supply 30 includes a flyback converter 32, which includes a step down transformer 34 that is connected to the high voltage DC bus capacitor 204, an integrated switch controller 36 for controlling current flow through the primary windings of the transformer 34, an output capacitor 38 for storing charge from the secondary windings of the transformer 34 and a flyback converter diode 39 for controlling current to the output capacitor 38. The transformer 34 is configured to bring the voltage from an input voltage (e.g. 400V) from the HVDC bus capacitor 204 down to a suitable output voltage (e.g. 23V). The high turn ratio between the primary and secondary sides of the transformer 34 may be achieved by providing a PCB planar transformer. Another way may be by using a transformer in series on the primary side and in parallel on the secondary side.

When the integrated switch controller 36 is closed, no current flows to the output capacitor 38, due to the reverse biased flyback converter diode 39. The integrated switch controller 36 may control the operation of the transformer 34 and the charging of the output capacitor 38 in any suitable way, such as, for example, by pulse-width modulation (PWM). An opto-coupler 41, which has a primary diode 52, provides feedback to the integrated switch controller 36 as to the voltage at the capacitor 38, while ensuring that the high-voltage electrical components are isolated from the low voltage electrical components. As the voltage across the capacitor 38 drops the current through the primary diode 52 changes, which is sensed by the opto-coupler 41 and is transmitted to the integrated switch controller 36. This feedback enables the integrated switch controller 36 to determine when to open or close. When the voltage at the output capacitor 38 drops, the integrated switch controller 36 opens so that the transformer 34 charges the capacitor 38 until it reaches a suitable voltage.

The resistor 214 is provided to divert a suitable fraction of the current flow therethrough instead of passing the current through the primary diode 52. The zener diode shown at 50 is provided to control the voltage to which the capacitor 38 is charged.

The positive and negative conduits shown at 42 and 44 at the output from the flyback converter 32 are tied in to the positive and negative conduits 23 and 24 from the boost converter 20 (FIG. 2). Thus, the output capacitor 38 is connected in parallel to the main low voltage capacitor 22.

A reverse biased secondary power supply diode 46 is provided on the positive conduit 42 between the output capacitor 38 and the main low voltage capacitor 22. Because the output capacitor 38, when fully charged, is at 23V, this diode 46 prevents current flow from the output capacitor 38 to the main low voltage capacitor 22 when the main low voltage capacitor 22 is fully charged at 25V.

A bleeding resistor 40 is connected in parallel to the output capacitor 38 between the output capacitor 38 and the secondary power supply diode 46. The bleeding resistor 40 is provided so that a small amount of current is continuously lost, thereby maintaining the integrated switch controller 36 in an active state (i.e. switching relatively regularly so as to maintain the desired voltage at the capacitor 38). By doing this the integrated switch controller 36 never enters a sleep mode as a result of non-use. As a result, in the event that the capacitor 38 is needed to short circuit the motor 14 (FIG. 1), the integrated switch controller 36 is active and is sending power to the capacitor 38 as needed. By contrast, if the capacitor 38 were allowed to charge to a target voltage and the integrated switch controller 36 were permitted to enter a sleep mode due to non-use, when it is needed the integrated switch controller 36 could take several milliseconds to leave sleep mode and become active, which would be too long, since overcharging of the HVDC bus capacitor 204 could occur within microseconds if not addressed.

Under normal conditions, when power from the battery pack 16 is available and when the primary power supply 17 is operating normally, the load current of the flyback converter 32 may be about 1 mA when using a 20K Ohm bleeding resistor 40.

A secondary power supply test switch 48 is provided to assist in checking the secondary power supply 30. Under normal operating conditions, the test switch 48 is open, and the voltage across the zener diode shown at 50 and the internal diode shown at 52 from the opto-coupler 41, is the voltage across the output capacitor 38. When power is supplied to test switch 48, the switch 48 closes and provides a connection between a voltage divider resistor 54 and ground. As a result, some current will flow through the voltage divider resistor 54, which will result in a particular voltage across the resistor 54. This causes the voltage across the zener diode 50 to be the same voltage as that across the resistor 54, and will change the voltage across the capacitor 38. If the secondary power supply 30 is operating as expected, the integrated switch controller 36 will maintain the new voltage. When the voltage is measured at the test conduit shown at 56, a change can be measured between the two states of the test switch 48 if the secondary power supply 30 is functioning properly. The test conduit 56 and the test switch 48 can be connected to a vehicle controller (not shown) so that this testing can be carried out automatically as needed. The vehicle controller can take appropriate action if it determines that the secondary power supply 30 is not operating as expected.

During normal operation, (i.e. when the primary power supply 17 is operating properly and the battery pack 16 is operating properly), the secondary power supply 30 may be considered to be in a sleeping mode, whereby the voltage will drop relatively slowly from 23V at the capacitor 38 due to the bleeding resistor 40, thereby causing the integrated switch controller 36 to maintain the capacitor 38 at 23V. Depending on the input voltage to the transformer 34, the switch controller 36 may be switching at a relatively low duty ratio, (e.g. 5%). The power loss when in the sleeping mode may be less than about 0.1 W.

When the primary power supply 17 fails, the diode 46 will permit current flow from the output capacitor 38 to the gate drive. The current may be about 100 mA. Based on 23V output the power rating for the flyback converter 32 is 2.5 W. The capacitor 38 will drain more quickly in this mode (which may be referred to as an active mode) and will therefore cause switching of switch controller 36 at a higher duty ratio. The switch controller 36 may be configured to switch at a rate of about 70 kHz to about 130 kHz depending on the input voltage.

It will be understood that the integrated switch controller 36 could be replaced by a separate switch and a separate controller in a less preferred embodiment.

The switch controller 36 may be configured to only permit operation of the flyback converter 32 in the event that there is more than about 50V present from the battery pack 16 so as to ensure that the switch controller 36 only operates when there is high voltage available.

By drawing energy from the HVDC bus capacitor 204, the secondary power supply 30 is operable even when the main contactor 202 is open, which is when the HVDC bus capacitor 204 is at risk of being overcharged.

While the above description constitutes a plurality of embodiments of the present invention, it will be appreciated that the present invention is susceptible to further modification and change without departing from the fair meaning of the accompanying claims.

The invention claimed is:

1. A circuit for powering a gate drive for an electric motor for a vehicle with an electric motor, comprising:
 a primary power supply including:
  a voltage step up device having an input side and an output side, wherein the input side is connectable to a low voltage energy source, wherein the output side is at a selected main low voltage and is connected to a main low voltage capacitor, wherein the main low voltage capacitor is connectable to the gate drive, and the gate drive controls a plurality of switches via voltage provided by the main voltage capacitor to short current generated from the electric motor and propagated to a high voltage DC capacitor from the vehicle; and
 a secondary power supply including:
  a voltage step down device having an input side and an output side, wherein the input side is electrically connectable to the high voltage DC capacitor from the vehicle, wherein the output side is connected to charge an output capacitor;
  a secondary power supply diode positioned between the output capacitor and the main low voltage capacitor, wherein the secondary power supply diode is configured to open when the voltage at the output capacitor is higher than the voltage at the main low voltage capacitor;
  a switch for controlling current flow to the output capacitor via the voltage step down device; and
  a controller operatively connected to the switch.

2. A circuit as claimed in claim 1, wherein the voltage step down device, the main low voltage capacitor, the switch and the controller are part of a flyback converter.

3. A circuit as claimed in claim 1, further comprising a bleeding resistor having at least a selected resistance positioned between the output capacitor and the secondary power supply diode, and connected to ground.

4. A circuit as claimed in claim 1, further comprising:
 a voltage divider resistor connected in parallel to zener diode, wherein the zener diode controls the voltage of the output capacitor;
 a test switch, wherein closing of the test switch connects the voltage divider resistor to ground, in parallel with the zener diode, thereby changing the voltage across 5 the zener diode; and
 a test terminal connected to the output capacitor, which is connectable to a controller to determine the voltage at the capacitor.

5. A circuit as claimed in claim 1, wherein the electrical motor is in a regen mode, in response to a charge on the high voltage DC capacitor being over a predetermined threshold, the gate drive controls the plurality of switches to short current.

6. A circuit as claimed in claim 1, wherein the plurality of switches permeate a 3-phase short.

7. A circuit as claimed in claim 1, wherein the secondary power supply is provided power from the high voltage power supply.

8. A circuit as claimed in claim 7, wherein the secondary power supply operates in response to a failure of the primary power supply.

9. A circuit as claimed in claim 1, wherein the input of the secondary power supply is connected to a main contactor.

10. A circuit as claimed in claim 1, wherein the main contactor is connected between a battery pack and the second power supply.

* * * * *